(12) United States Patent
Earhart et al.

(10) Patent No.: US 12,425,313 B2
(45) Date of Patent: *Sep. 23, 2025

(54) IMPACT PREDICTIONS BASED ON INCIDENT-RELATED DATA

(71) Applicant: MASTERCARD INTERNATIONAL INCORPORATED, Purchase, NY (US)

(72) Inventors: Steven Earhart, Kirkwood, MO (US); Leila Hassan, Ballwin, MO (US); James J. Arnott, Ballwin, MO (US); Adam Suarez, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,458

(22) Filed: Jul. 12, 2023

(65) Prior Publication Data
US 2023/0362071 A1    Nov. 9, 2023

Related U.S. Application Data

(63) Continuation of application No. 17/459,309, filed on Aug. 27, 2021, now Pat. No. 11,711,275.
(Continued)

(51) Int. Cl.
*H04L 41/5074* (2022.01)
*H04L 41/147* (2022.01)
(Continued)

(52) U.S. Cl.
CPC ........ *H04L 41/5074* (2013.01); *H04L 41/147* (2013.01); *H04L 41/16* (2013.01);
(Continued)

(58) Field of Classification Search
CPC ....... H04L 41/507; H04L 41/12; H04L 41/16; H04L 41/5025; H04L 41/5074; H04L 43/04; H04L 43/50
(Continued)

(56) References Cited

U.S. PATENT DOCUMENTS 6,037,009 A    3/2000  Clare
6,473,432 B1   10/2002 Nishimura et al.
(Continued)

FOREIGN PATENT DOCUMENTS

CN    111445094 A  *  7/2020  .............. G06N 3/126

*Primary Examiner* — Ruolei Zong
(74) *Attorney, Agent, or Firm* — Barta Jones, PLLC

(57) ABSTRACT

The disclosure herein describes predicting potential impact of issues reported in incident ticket data on infrastructure element. A ticket manager component includes an impact model utilizing machine learning to analyze real-time event and metric data with incident-related data to generate predicted impact data. The predicted impact data identifies potentially impacted infrastructure elements, such as, potentially impacted users, predicted infrastructure components impacted by the issue and/or an updated time-period associated with the issue. The ticket manager component creates labeled incident tickets by updating user-generated incident tickets with additional data generated by the impact model, including predicted impact data and/or additional details associated with the issue. The labeled incident tickets are provided back to the model as training data to further refine predictions generated by the model.

20 Claims, 10 Drawing Sheets

Related U.S. Application Data

(60) Provisional application No. 63/071,480, filed on Aug. 28, 2020.

(51) Int. Cl.
*H04L 41/16* (2022.01)
*H04L 41/5025* (2022.01)
*H04L 41/507* (2022.01)
*H04L 43/04* (2022.01)
*H04L 43/08* (2022.01)
*H04L 43/50* (2022.01)

(52) U.S. Cl.
CPC ........ *H04L 41/5025* (2013.01); *H04L 41/507* (2013.01); *H04L 43/04* (2013.01); *H04L 43/50* (2013.01); *H04L 43/08* (2013.01)

(58) Field of Classification Search
USPC .......................................................... 709/224
See application file for complete search history.

(56) References Cited

U.S. PATENT DOCUMENTS

| | | | |
|---|---|---|---|
| 6,732,534 B2 | 5/2004 | Spry et al. | |
| 6,756,178 B2 | 6/2004 | Katano et al. | |
| 9,317,829 B2 | 4/2016 | Anand et al. | |
| 2008/0256132 A1 | 10/2008 | Munro | |
| 2010/0161539 A1 | 6/2010 | Kandanala et al. | |
| 2011/0126111 A1* | 5/2011 | Gill | G06F 21/577 715/736 |
| 2013/0051239 A1* | 2/2013 | Meredith | H04W 16/18 370/241 |
| 2013/0132060 A1 | 5/2013 | Badhe | |
| 2013/0173514 A1 | 7/2013 | Cruickshank, III et al. | |
| 2013/0179736 A1 | 7/2013 | Gschwind | |
| 2014/0006861 A1 | 1/2014 | Jain et al. | |
| 2014/0351176 A1 | 11/2014 | Jan et al. | |
| 2016/0179853 A1* | 6/2016 | Bertin | G06F 16/113 707/662 |
| 2018/0324062 A1* | 11/2018 | Chen | H04L 41/0816 |
| 2018/0373578 A1* | 12/2018 | Bridges | G06F 11/3604 |
| 2019/0036797 A1 | 1/2019 | Margalit | |
| 2019/0102717 A1* | 4/2019 | Wu | H04L 41/147 |
| 2019/0347282 A1* | 11/2019 | Cai | G06N 5/022 |
| 2020/0285697 A1* | 9/2020 | Balasubramanian | G06F 16/355 |
| 2020/0293946 A1 | 9/2020 | Sachan | |
| 2021/0224353 A1* | 7/2021 | Boussac | H04L 41/142 |
| 2021/0352095 A1* | 11/2021 | Cam | G06N 7/01 |

\* cited by examiner

IMPACT PREDICTIONS BASED ON INCIDENT-RELATED DATA

CROSS-REFERENCE TO RELATED APPLICATION(S)

This application is a continuation of and claims the benefit and priority of U.S. Non Provisional application Ser. No. 17/459,309 filed Aug. 27, 2021, entitled "Impact Predictions Based on Incident-Related Data", which claims the benefit of and priority to U.S. Provisional Application No. 63/071,480 filed Aug. 28, 2020, entitled "Impact Predictions Based on Incident-Related Data", the entireties of which are incorporated herein by reference.

BACKGROUND

An incident ticket is a data entity associated with an issue or perceived issue associated with a computing system, such as, but not limited to, a problem experienced by a user attempting to use an application or other service hosted on the system. An incident ticket can be created by a human user or an automated monitoring tool or other process. An incident ticket can include information identifying the user, the time at which the problem occurred, type of problem experienced by the user, or other information. Incident tickets can be used during root cause analysis to solve the problem or prevent future problems. However, incident tickets frequently contain incomplete information and/or inaccurate information. Moreover, manual review of these user-generated incident tickets can be a time-consuming and inefficient process.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for predicting impact on infrastructure elements based on incident ticket data. An extraction component identifies impact data associated with at least one issue based on incident-related data obtained from a selected incident ticket. The impact data including an impact time-period. A prediction component generates predicted impact data including additional data describing a set of potentially impacted infrastructure elements. The set of potentially impacted infrastructure elements includes a set of potential impacted users and/or a set of potentially impacted infrastructure components. An update component creates a set of labeled incident tickets associated with the issue, the labeled incident ticket including at least a portion of the predicted impact data.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 10, the systems are illustrated as schematic drawings. The drawings may not be to scale.

DETAILED DESCRIPTION

Aspects of the disclosure provide a computerized method and system for updating incident tickets with additional details and predicting of an issue on infrastructure elements within an enterprise system based on user-provided incident ticket data. Incident ticket data is used during root cause analysis of incidents. However, the user-provided data in incident tickets can be incomplete and/or inaccurate. The ticket manager component of the disclosure analyzes real-time system monitor data, including event logs and performance metrics, to provide additional missing details to the incident tickets as well as to identify infrastructure hardware and software components likely to be impacted by the reported issue.

The disclosure operates in an unconventional way by utilizing a machine learning prediction model to analyze available real-time data identify potentially impacted infrastructure components, software, and users likely to be affected by an issue reported in an incident ticket. The system verifies information provided by users in incident tickets, as well as adds additional details associated with the issue or perceived issue in the incident ticket. This additional detail and verification of information enables standardization or root cause analysis. It further facilitates and augments the root cause analysis using automated processes based on evidence. Thus, the ticket manager reduces the amount of time users spend on root cause analysis by providing more accurate and detailed information to the users.

Further, the updated incident tickets are provided by to the impact model as training data. The updated incident tickets are used as training data and feedback to further improve the accuracy and reliability of the updated/labeled incident tickets generated by the system. As more incident tickets are received and handled by the system, the accuracy of the system predictions become more accurate. This improves the quality of incident ticket data and permits quicker customer response by reducing both customer response time and root cause analysis time.

Figure 1:
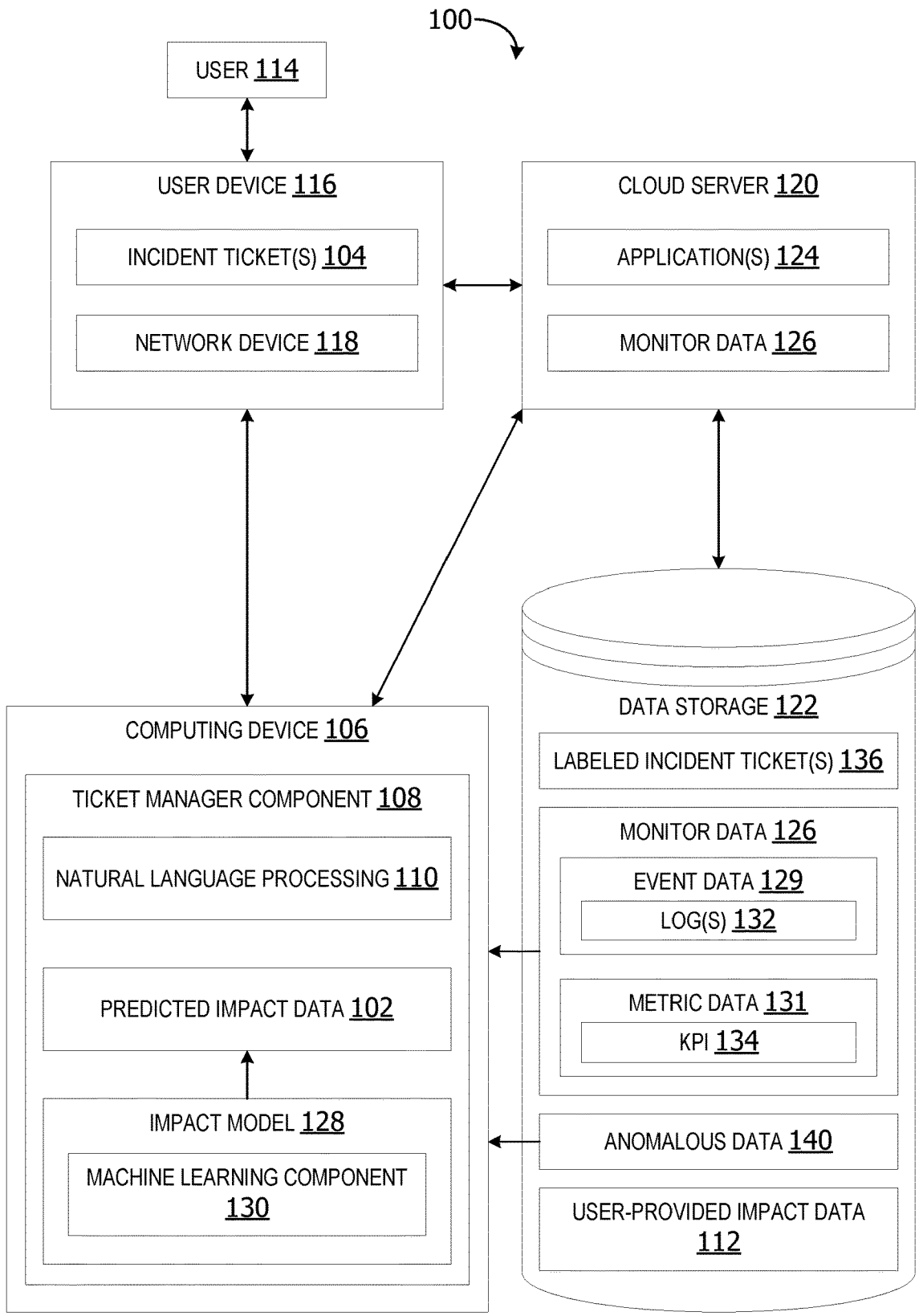
FIG. 1 is an exemplary block diagram illustrating a system configured for generating predicted impact data based on incident tickets according to an embodiment.

FIG. 1 is an exemplary block diagram illustrating a system 100 configured for generating predicted impact data 102 based on incident ticket(s) 104 according to an embodiment. The computing device 106 represents one or more devices executing computer-executable instructions, such as, but not limited to, application programs, operating system functionality, etc. The computing device 106 can be implemented as a set of computing devices in a data center, one or more servers, one or more desktop computers, a mobile computing device or any other type of device. A server can include any type of server, such as, but not limited to, a web server, a blade server, an application server, a server in a rack, etc. Additionally, the computing device 106 can represent a group of processing units or other computing devices.

The computing device 106 in this example includes one or more computer-readable media, such as a memory (not shown) or other data storage for storing data. In this example, the computing device 106 includes a ticket manager component 108. The ticket manager component 108 performs natural language processing (NLP) 110 on the one or more incident ticket(s) 104 to identify user-provided impact data 112. The NLP is an analysis of user-written incident.

The user-provided impact data 112 in this non-limiting example is data provided by a user 114. The user-provided impact data 112 is data describing an issue or perceived issue associated with the user's utilization of software and/or services associated with the system 100. In this example, the user 114 generates the incident ticket(s) 104 via a user device 116.

The user device 116 represents any device executing computer-executable instructions capable of sending and receiving data via a network. The user device 116 can be implemented as a mobile computing device, such as, but not limited to, a cellular telephone, a wearable computing device, a mobile telephone, laptop, tablet, computing pad, netbook, gaming device, and/or any other portable device. The user device 116 includes at least one processor and a memory (not shown). The user device 116 can also optionally include a user interface component.

A network device 118 is implemented by one or more physical network components, such as, but without limitation, routers, switches, network interface cards (NICs), and other network devices. The network is any type of network for enabling communications with remote computing devices, such as, but not limited to, a local area network (LAN), a subnet, a wide area network (WAN), a wireless (Wi-Fi) network, or any other type of network. The network device 118 enables the user device to connect with one or more remote computing devices, such as, but not limited to, the computing device 106, a cloud server 120 and/or a remote data storage device 122.

The cloud server 120 is a logical server providing services to one or more other devices, such as, but not limited to, the computing device 106 and/or the user device 116. The cloud server 120 is hosted and/or delivered via a network. In some non-limiting examples, the cloud server 120 is associated with one or more physical servers in one or more data centers. In other examples, the cloud server 120 is associated with a distributed network of servers.

The cloud server 120 in this non-limiting example hosts one or more application(s) 124 and/or provides services. The application(s) can include any type of applications, such as, but not limited to, a web application, a data storage application, a software as a service (SaaS), or any other type of application.

The cloud server 120 can optionally generate and/or store monitor data 126. The monitor data 126 is data associated with the status, performance, operation and/or utilization of the cloud server and/or application(s) 124. The monitor data 126 can include, without limitation, data generated by the cloud server 120, the application(s) 124, the user device 116, the data storage device 122, the computing device 106 and/or any other component associated with the system 100. The monitor data 126 in this example includes event data and/or metric data. Event data 129 can include log(s) 132, diagnostics data, or any other data associated with an event/incident. Metric data 131 is data associated with performance metrics, such as, but not limited to, resource utilization, processing speed, response time, storage capacity, etc. The metric data 131 can include key performance indicators (KPI) 134 for one or more resources/components on the system 100.

The system 100 can optionally include a data storage device 122 for storing data, such as, but not limited to monitor data 126 and/or user-provided impact data 112 obtained from the incident ticket(s) 104. The data storage device 122 can include one or more different types of data storage devices, such as, for example, one or more rotating disks drives, one or more solid state drives (SSDs), and/or any other type of data storage device. The data storage device 122 in some non-limiting examples includes a redundant array of independent disks (RAID) array. In other examples, the data storage device 122 includes a database. The data storage device 122 can be included within the computing device. In this example, the data storage device 122 is a remote data storage accessed via a network, such as a remote data storage device, a data storage in a remote data center, or a cloud storage.

The ticket manager component 108 includes an impact model utilizing a machine learning component 130. The machine learning component may include pattern recognition, modeling, or other machine learning algorithms to analyze impact data and/or labeled incident tickets.

Labeled incident tickets are incident tickets including more detailed description of the reported issue, impacted system components, impacted users, impact time-period and/or any other information associated with the incident/issue reported in the user-generated incident ticket. The labeled incident tickets can be sent to incident management (IcM) personnel for utilization in solving the problem, eliminating or minimizing the issue and/or preventing recurrence of the reported issue and/or predicted impact of the issue. The additional information provided by the labeled incident tickets assist human users with identifying the problem(s) and/or providing a solution to the problem. Thus, the labeled incident tickets autonomously generated by the system reduce user time spent obtaining/searching for relevant data associated with a reported incident and further enable improved user efficiency in systems trouble shooting and incident management by identifying potentially impacted system components and users which have not been previously identified in any incident tickets.

In other examples, the labeled incident tickets generated by the system can be used to train a machine learning component to autonomously generate labeled incident tickets based on the more limited information provided in user-generated incident tickets and real-time monitor data, including anomalous data detected during the relevant impact time-period associated with the incident/reported issue.

The machine learning component 130 in some non-limiting examples classifies received incident tickets based on the impacted infrastructure, programs, customers and timeframes associated with an issue/incident. For example, incident tickets associated with network connectivity issues could be classified in one class/group while incident tickets associated with an application that will not load could be classified in another group/class. In another non-limiting example, incident tickets associated with login/user authentication issues could be classified in still another class/group.

The machine learning component analyzes impact data 112 identified by the NLP 110 to generate predicted data. The predicted impact data is generated based on analysis of the impact data with infrastructure data describing the infrastructure components, as well as monitor data associated with a set of infrastructure components. The impact data 112 is data associated with at least one issue described at least in part in one or more incident ticket(s) 104. The impact data can include an identification of an impact time-period, infrastructure components impacted by the issue and/or user(s) impacted by the issue. The monitor data can include real-time monitor data and/or monitor data previously generated which is retrieved from a data storage, such as, but not limited to, the data storage device 122.

The predicted impact data generated by the ticket manager component 108 is data identifying any additional system elements likely to be impacted by the issue reported in an incident ticket. In other words, the predicted impact data includes additional data describing a set of one or more infrastructure elements which are potentially impacted by the reported issue. Infrastructure elements include system hardware, software/applications, users utilizing or attempting to utilize the system, etc.

In an example, the set of potentially impacted infrastructure elements includes a set of one or more users which are potentially impacted by the issue and a set of one or more potentially impacted infrastructure components. Infrastructure components include hardware and/or software components associated with the system 100. Infrastructure components can include, for example but without limitation, servers, network devices, data storage devices, printer, operating system, web browser, applications, search engines, processors, physical memory, etc.

The ticket manager component 108 updates the incident tickets created by users with the additional predicted impact data. The updated incident tickets including additional details are referred to as labeled incident tickets. The ticket manager component 108 creates the one or more labeled incident ticket(s) 136 by adding at least a portion of the predicted impact data to the user-created incident tickets.

In other examples, the ticket manager component 108 analyzes the monitor data 126 generated during the impact time-period and identifies anomalous data 140 generated during that time-period. The monitor data 126 can be analyzed using data mining and analytics to identify the data portions that are associated with the problem reported in an incident ticket. Anomalous data 140 is data indicative of an infrastructure component failing to operate/function as expected, a component deviating from normal operational standards, or data otherwise indicating a change in performance of one or more elements. Anomalous data 140 can include an increase in processing time (greater lag time), reduction in resource availability, network failure, inability to load software, login failure, device shutdown, communication/transmission lag, or other anomalies occurring during the impact time-period associated with the reported issue identified in the selected incident ticket.

The impact time-period is a period of time surrounding the time at which the reported issue occurred. The impact time-period includes a start time and an end time. The impact time-period can be a time-period identified by the user 114 in an incident ticket. The impact time-period can also include an expanded, refined, or otherwise updated time-period generated by the ticket manager component 108.

Figure 2:
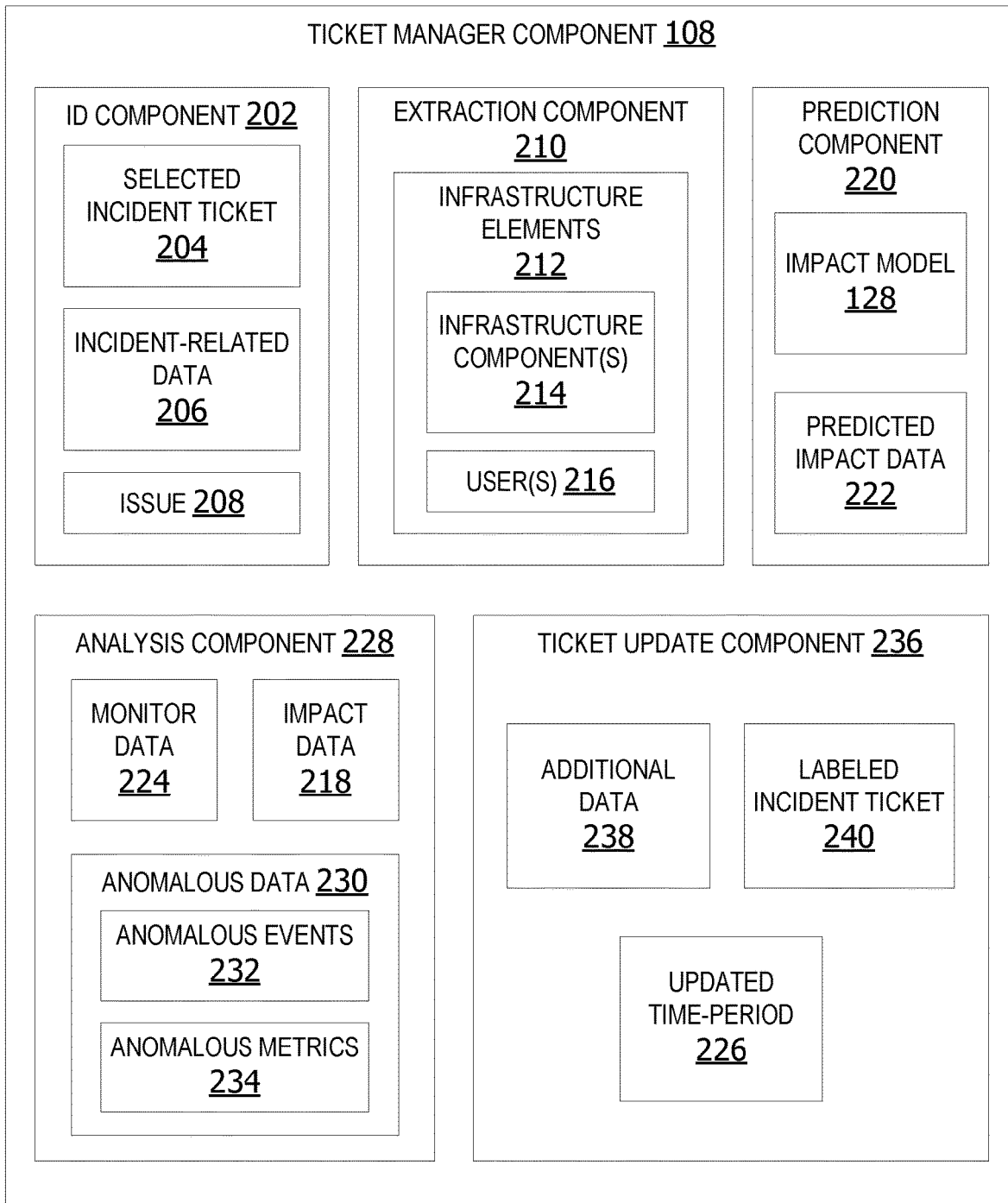
FIG. 2 is an exemplary block diagram illustrating ticket manager component according to an embodiment.

FIG. 2 is an exemplary block diagram illustrating ticket manager component 108 according to an embodiment. A selected incident ticket 204 is a trouble ticket including natural language text describing an issue or part of an issue experienced by a user utilizing or attempting to utilize an application or other software on the system. In some examples, an identification (ID) component 202 analyzes the selected incident ticket using natural language processing to extract incident-related data 206 associated with an issue 208. The issue 208 is a problem, issue, perceived issue or incident associated with the system, infrastructure, service, software, operation, function, system performance and/or user-interaction with the system.

The incident-related data 206 can include a description of the problem/issue. For example, the incident-related data 206 may include a statement that program "A" is experiencing a problem.

In some examples, an extraction component 210 analyzes the incident-related data 206 to identify impacted infrastructure elements 212. Infrastructure elements 212 can include infrastructure components 214 and/or user(s) 216 utilizing or attempting to utilize those infrastructure components 214 during a given time-period, such as the impact time-period. Infrastructure components 214 can include both hardware components and software, such as application(s).

The extraction component 210 identifies impact data 218, including the impacted infrastructure elements, associated with at least one issue 208 based on the incident-related data 206 obtained from the selected incident ticket 204. The impact data 218 includes the impact time-period. Thus, the impact data includes user-generated data extracted from the selected incident ticket identifying at least one of a set of impacted infrastructure components, a set of impacted users, an impact start time and/or an impact end time identified by the user. The impact data can be incomplete or inaccurate. Therefore, a prediction component 220 analyzes the impact data using an impact model 128 and real-time monitor data to verify the impact data and/or add additional details to the impact data as needed to provide a more accurate/detailed description of the issue.

The prediction component 220, including the impact model 128, generates the predicted impact data 222 based on analysis of the impact data 218 and real-time monitor data 224 generated during the impact time-period. The predicted impact data 222 includes identification of additional users predicted to be impacted by the issue 208, additional infrastructure components predicted to be impacted by the issue and/or an updated time-period 226 associated with the issue. In this example, the updated time-period is a time period including the time at which the issue 208 occurred which has been expanded to include additional time.

The updated time-period can be generated based on monitor data and/or anomalous data associated with the reported issue. For example, if the user reports an inability to login to an application and metric data indicates the application failed to load for over an hour after the incident ticket reported time-period, the impact time-period can be updated/expanded to include the hour following the incident until the indicated application finally loaded. This updated time-period is then used to identify other users and/or system components which may have been impacted negatively by this unavailable application or services associated with the application during the expanded impact time-period.

The prediction component 220 in some examples analyzes infrastructure data, including a set of known infrastructure components identifying at least one of hardware components and software components. The prediction component 220 identifies potentially impacted infrastructure components associated with the issue from the set of known infrastructure components. The list of potentially impacted infrastructure components include hardware and software components which were unidentified in the selected incident ticket. For example, if the selected incident ticket failed to identify a server associated with the issue, the prediction component 220 analyzes the monitor data, impact data and/or infrastructure data to identify the relevant server hosting the application/software associated with the issue.

In other examples, the prediction component 220 analyzes the infrastructure data, including a set of known users associated with at least one infrastructure component potentially impacted by the issue. The prediction component 220 identifies a list of additional users predicted to have experienced a problem due to the issue. The additional users include one or more users which were not identified in the selected incident ticket but which are predicted to have been or likely to have been affected by the same issue.

The prediction component 220 analyzes monitor data and infrastructure data to determine whether to expand the impact time-period identified in the selected incident ticket. In one example, the time-period is expanded to include a twenty-four-hour time period before and/or after the identified time at which the original issue 208 occurred. The prediction component 220 updates the impact time-period to include an earlier start time and/or a later end time.

For example, if the impact time was 3:30 p.m., the prediction component 220 can update the time-period to include a period of time from 3:00 p.m. until 4:00 p.m. In this example, the system analyzes monitor data generated during the expanded one-hour time-period.

In another example, if the impact time was between 2:00 p.m. and 2:30 p.m. on Monday, the impact time-period can be expanded from 8:00 a.m. on Monday until 8:00 a.m. on Tuesday to expand the relevant time-period. In this example, the system analyzes monitor data generated during the expanded twenty-four-hour time-period.

An analysis component 228 analyzes the real-time monitor data 224 during the impact time-period and/or the updated impact time-period 226 to identify anomalous data 230. Anomalous data 230 is data indicative of an infrastructure component failing to operate/function as expected, deviating from normal operational standards, or otherwise indicating a change in performance. The set of anomalous data 230 includes anomalous event data 232 and/or anomalous metric data associated with the issue 208.

Given an incident ticket, the ticket manager component 108 in some examples dynamically determines impacted infrastructure, customers, programs and timeframes. Using key pieces of data, including the impact data, the ticket manager component 108 searches for anomalous events and metrics to determine potential KPIs that indicated the event/reported issue. The ticket manager component 108 utilizes the anomalous data with the impact data and/or other monitor data to generate the predicted impact data, including predicted impacted infrastructure, customers, programs and timeframes associated with the reported issue identified in the selected incident ticket.

In other examples, anomalous data can include any type of log data, error messages, metric data, failover data, and/or other performance data indicating an issue with system components. Anomalous data can include data describing one or more events/issues which were not reported in an incident ticket but which occurred during the impact time-period for the reported time-period for the reported incident in the selected incident ticket. The anomalous data can include, for example, data identifying anomalies such as detected reduction in available system resources, network connection problems/communications issues, hardware failures, software loading issues, increase response wait times or other anomalies.

In other examples, a ticket update component 236 updates the selected incident ticket 204 with additional data 238 to generate a labeled incident ticket 240. The additional data 238 is data describing a set of potentially impacted infrastructure elements. The set of potentially impacted infrastructure elements including at least one of a set of potential impacted users and a set of potentially impacted infrastructure components based on analysis of the impact data with infrastructure data and monitor data (real-time data retrieved from storage) associated with a set of infrastructure components. The labeled incident tickets are provided back to the impact model as training data in a feedback loop.

Figure 3:
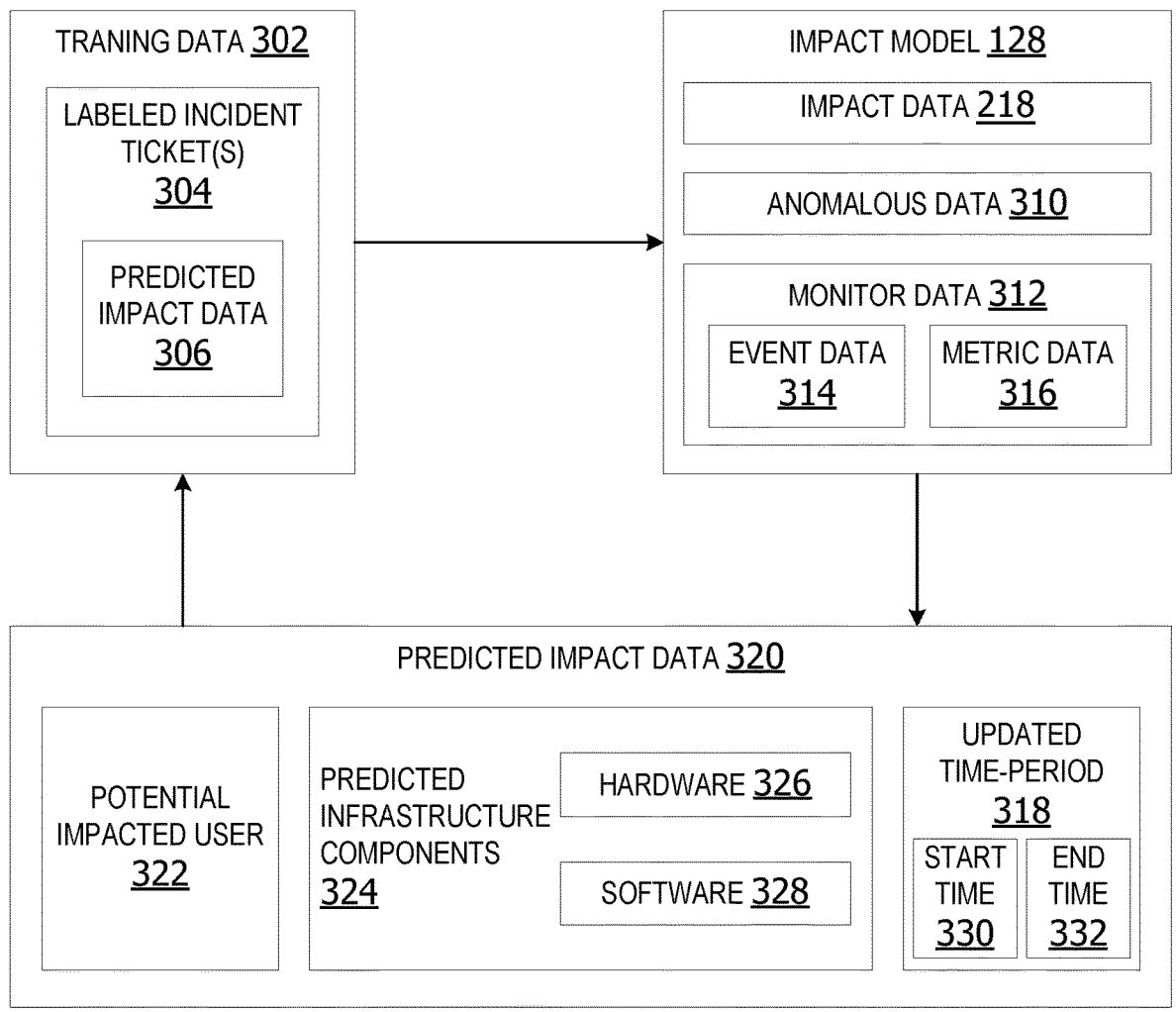
FIG. 3 is an exemplary block diagram illustrating an impact model receiving training data for training the model according to an embodiment.

FIG. 3 is an exemplary block diagram illustrating an impact model 128 receiving training data 302 for training the model according to an embodiment. The training data 302 is a collection of pre-labelled example data for model training.

In some examples, the training data 302 includes labeled incident ticket(s) 304 used to train the impact model and/or user-provided feedback. The labeled incident ticket(s) 304 include additional data which is unavailable in user-generated incident tickets received from customers. In other words, the labeled incident ticket(s) include more detailed/specific information associated with an issue affected infrastructure components within the system.

The impact model 128 includes a machine learning component which is trained using training data, such as, but not limited to, the machine learning component 130 in FIG. 1. The machine learning component utilizes pattern recognition and artificial intelligence to autonomously generate labeled incident tickets.

Initially, the impact model 128 can be trained using training data, including manually created labeled incident ticket(s). Once the model is trained, the trained impact model 128 analyzes incoming impact data 398 extracted from customer-created incident tickets, anomalous data 310 and/or monitor data 312 to autonomously generate labeled incident tickets without user intervention. The monitor data 312 includes event data 314 and/or metric data 316 associated with the impact time-period and/or the updated time-period 318. The impact model 128 is then trained using the autonomously generated labeled incident tickets and/or user-provided feedback.

Feedback is data associated with one or more labeled incident tickets crated by the impact model 128. The feedback can include, for example but without limitation, user-generated data indicating the accuracy of the labeled incident tickets and/or additional incident-related data associated with one or more labeled incident tickets. The feedback can be provided by engineers or other knowledgeable parties authorized to confirm or deny the accuracy of the labeled incident tickets created by the impact model 128. In one non-limiting example the feedback includes a uservalidation or confirmation score indicating a degree of accuracy of the incident ticket data.

In this example, the training data 302 includes labeled incident ticket(s) 304 with predicted impact data 306 created by the impact model 128 included. In this manner, the labeled incident tickets generated by the impact model provides training data to further refine/improve the impact model in real-time. The labeled incident ticket generated by the impact model includes more detailed description of the incident/reported issue, such as, but not limited to, a more precise impact timeframe, list of impacted infrastructure, and/or a list of metrics that experienced anomalous behavior during the impact time-frame.

The impact model 128 utilizes the labeled incident ticket (s) 304, anomalous data and/or monitor data associated with an issue described in a labeled incident ticket used as training data is further utilized in machine learning anomaly detection processes for dynamically finding anomalous events or metrics that could indicate the reported incident/event or other future predicted incidents/events. In other words, anomalous data occurring within the impact time-period indicating an event described in the training data can be used to teach the impact model to identify predicted incidents/events and/or predicted infrastructure components likely to be impacted by a new reported issue described in a newly received user-generated incident ticket.

In some examples, the machine learning component 130 comprises a trained regressor such as a random decision forest, a directed acyclic graph, a support vector machine, a convolutional neural network or other neural network, or another trained regressor. Such a trained regressor may be trained using training data as feedback data. It should further be understood that the machine learning component 130, in some examples, operates according to machine learning principles and/or techniques known in the art without departing from the systems and/or methods described herein.

In further examples, the machine learning component 130 of the impact model engages in supervised training wherein request-response pairs and/or other associated training data are used to determine categorization types of output responses that are provided in response to inputs by the impact model. Additionally, or alternatively, the machine learning component 130 can be configured to use active learning techniques based on defined filtering criteria to enable efficient training with reduced, filtered training sets for particular types of requests and responses.

In an example, the machine learning component 130 makes use of training data pairs when applying machine learning techniques and/or algorithms. Millions of training data pairs (or more) may be stored in a machine learning data structure. In some examples, a training data pair includes a timestamp-based feedback data value paired with an interval adjustment value. The pairing of the two values demonstrates a relationship between the feedback data value and the adjustment values that may be used by the machine learning module to determine future interval adjustments according to machine learning techniques and/or algorithms.

The impact model 128 generates predicted impact data 320 for a next received incident ticket. The predicted impact data 320 includes one or more potential impacted users 322, one or more predicted infrastructure components and/or the updated time-period. The predicted infrastructure components include hardware 326 and/or software 328 components. The updated time-period includes an updated start time 330 and/or an updated end time 332.

Figure 4:
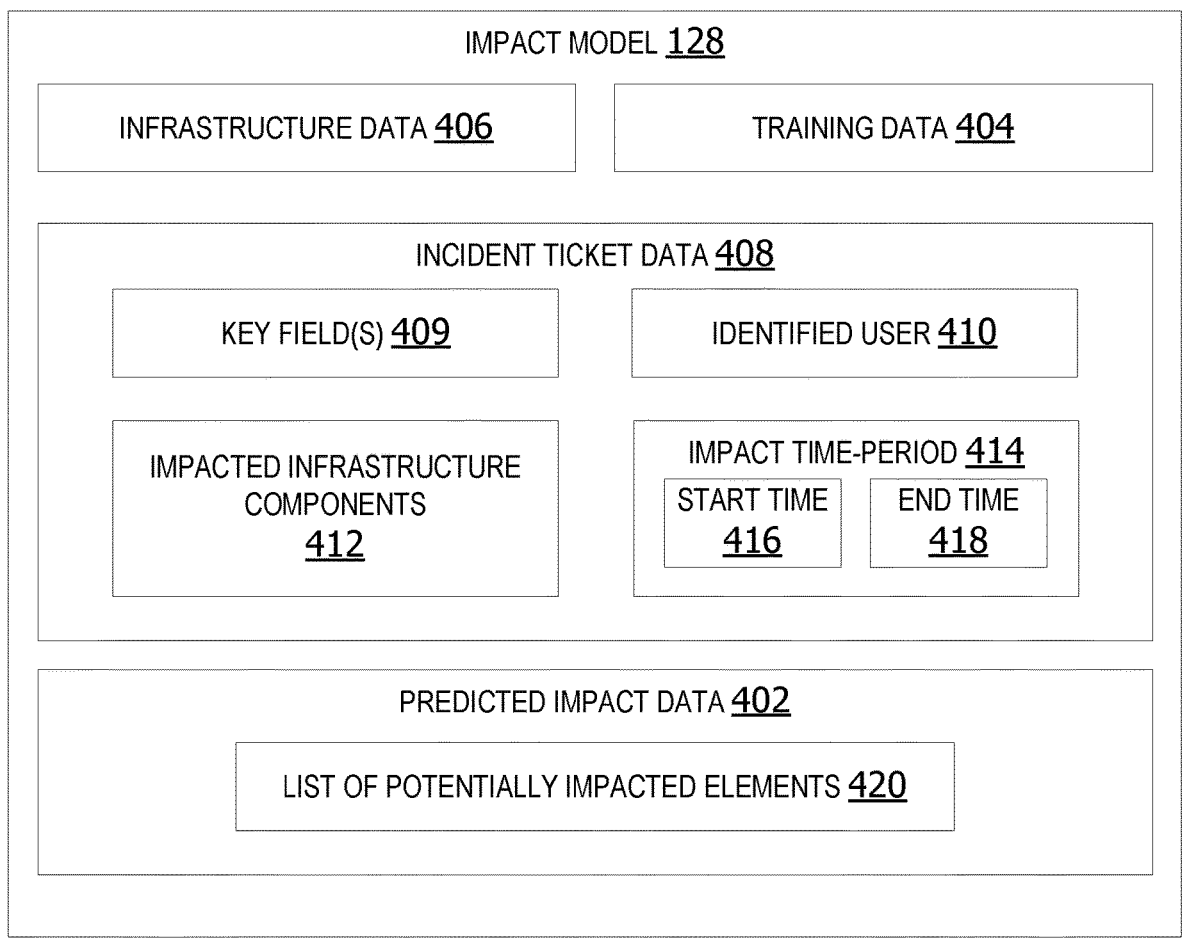
FIG. 4 is an exemplary block diagram illustrating an impact model for generating predicted impact data according to an embodiment.

FIG. 4 is an exemplary block diagram illustrating an impact model 128 for generating predicted impact data 402 according to an embodiment. The impact model 128 is initially trained using pre-generated training data 404. The training data 404 can be manually generated. The training data 404 can also include labeled incident tickets generated by one or more other impact models.

The trained impact model 128 analyzes infrastructure data 406 and incident ticket data 408 to generate predicted impact data 402. The infrastructure data 406 includes data associated with infrastructure elements. In some examples, the infrastructure data 406 includes a list of known users of the system, a list of infrastructure components and/or a list of software on the system.

The incident ticket data 408 includes data provided by the user or the process generating the ticket. The impact model utilizes information found in a set of key field(s) 409. The key field(s) 409 are fields of interest, such as, but not limited to, impacted infrastructure components 412, identified user 410 and/or impact time-period 414 identified in the incident ticket. The impact time-period 414 includes a start time 416 and an end time 418.

The predicted impact data 402 includes a list of potentially impacted elements 420 of the system. The list of potentially impacted elements 420 includes predicted users, programs, infrastructure and/or updated time-period associated with the issue. The updated time-period can be an expanded impact time-period including an earlier start time than the user-provided start time and/or an updated end time that is later than the user-provided end time identified in the user-generated incident ticket. Likewise, the updated time-period can be a narrowed/refined impact time-period which is shorter than the user-provided impact time-period. In this example, the updated start time can be later than the user-identified start time and/or the updated end time can be earlier than the user-identified end time provided in the selected incident ticket. This improves accuracy of the data mining/analysis of monitoring data and anomalous data detection for prediction of impact data.

Figure 5:
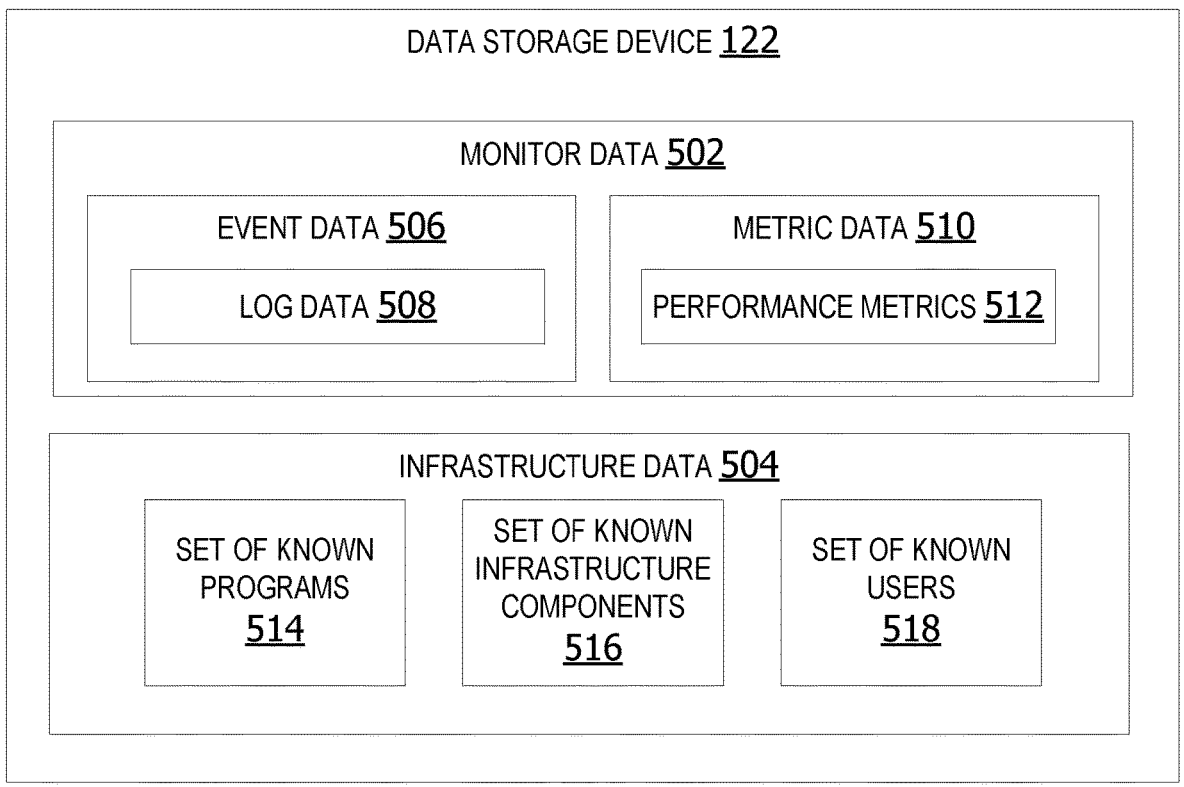
FIG. 5 is an exemplary block diagram illustrating a data storage device storing data according to an embodiment.

FIG. 5 is an exemplary block diagram illustrating a data storage device 122 storing data according to an embodiment. The data in this non-limiting example includes monitor data 502 and/or infrastructure data 504. The monitor data 502 includes event data 506, including log data. Metric data 510 includes performance metrics 512. In some examples, the system links portions of the log (event) data and metric data to the human-created incident tickets during analysis.

The infrastructure data 504 includes a set of known programs 514 running or otherwise available on the system. A set of known infrastructure elements 516 includes a list of hardware components and software components on the system. The set of known users 518 is a set of one or more customers or other users utilizing the system or attempting to utilize the system. A user can also include a user attempting but failing to log into or otherwise access the system.

Figure 6:
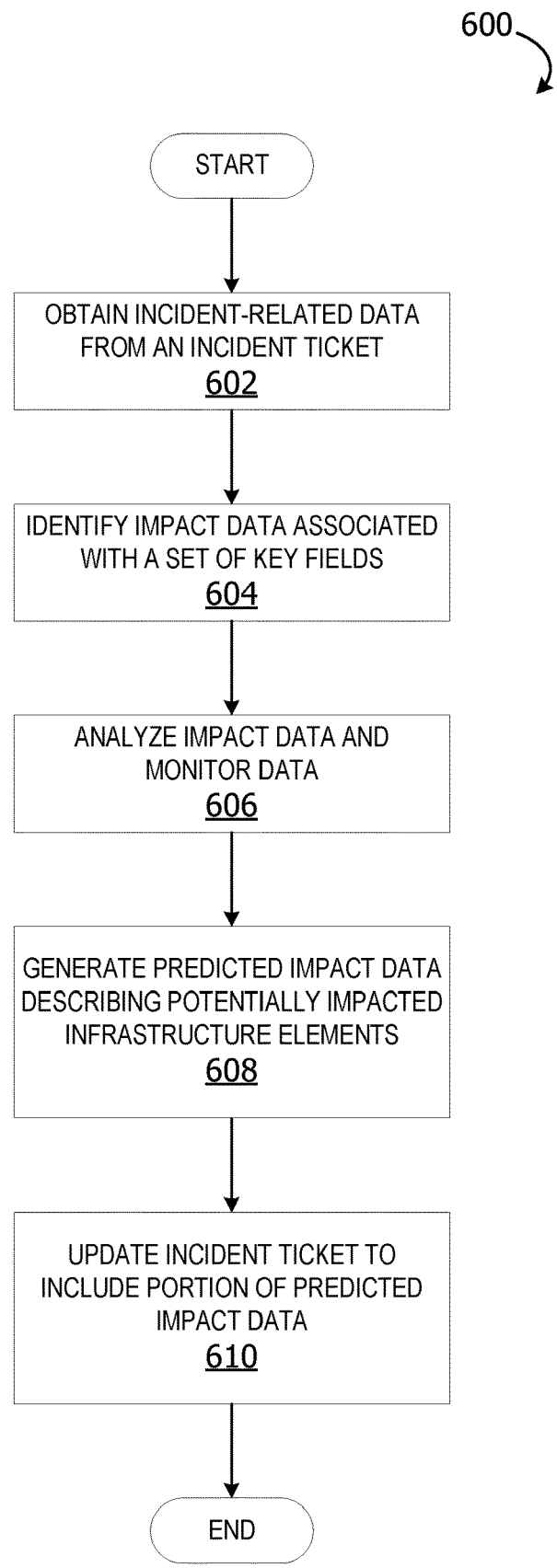
FIG. 6 is an exemplary flow chart illustrating a method of generating predicted impact data and updating incident tickets according to an embodiment.

FIG. 6 is an exemplary flow chart illustrating a method of generating predicted impact data and updating incident tickets according to an embodiment. It should be understood that the method 600 as described may be implemented and/or executed by one or more components of a system, such as system 100 and/or the ticket manager component 108 described above with respect to FIGS. 1 through 5.

The process begins by obtaining incident-related data from an incident ticket at 602. An incident ticket is a data entity describing an issue or perceived issue at least in part, such as, but not limited to, the one or more incident ticket(s) 104 in FIG. 1. At 604, impact data associated with a set of one or more key fields of the incident-related data is identified. At 606 the impact data and monitor data is analyzed. At 608, predicted impact data is generated. The predicted impact data describes potentially impacted infrastructure elements, such as, but not limited to, hardware components, software (applications) and/or users of the system. At 610, an incident ticket is updated to include a portion of the predicted impact data. The updated incident ticket is a labeled ticket, such as, but not limited to, labeled incident ticket(s) 136 in FIG. 1.

Figure 7:
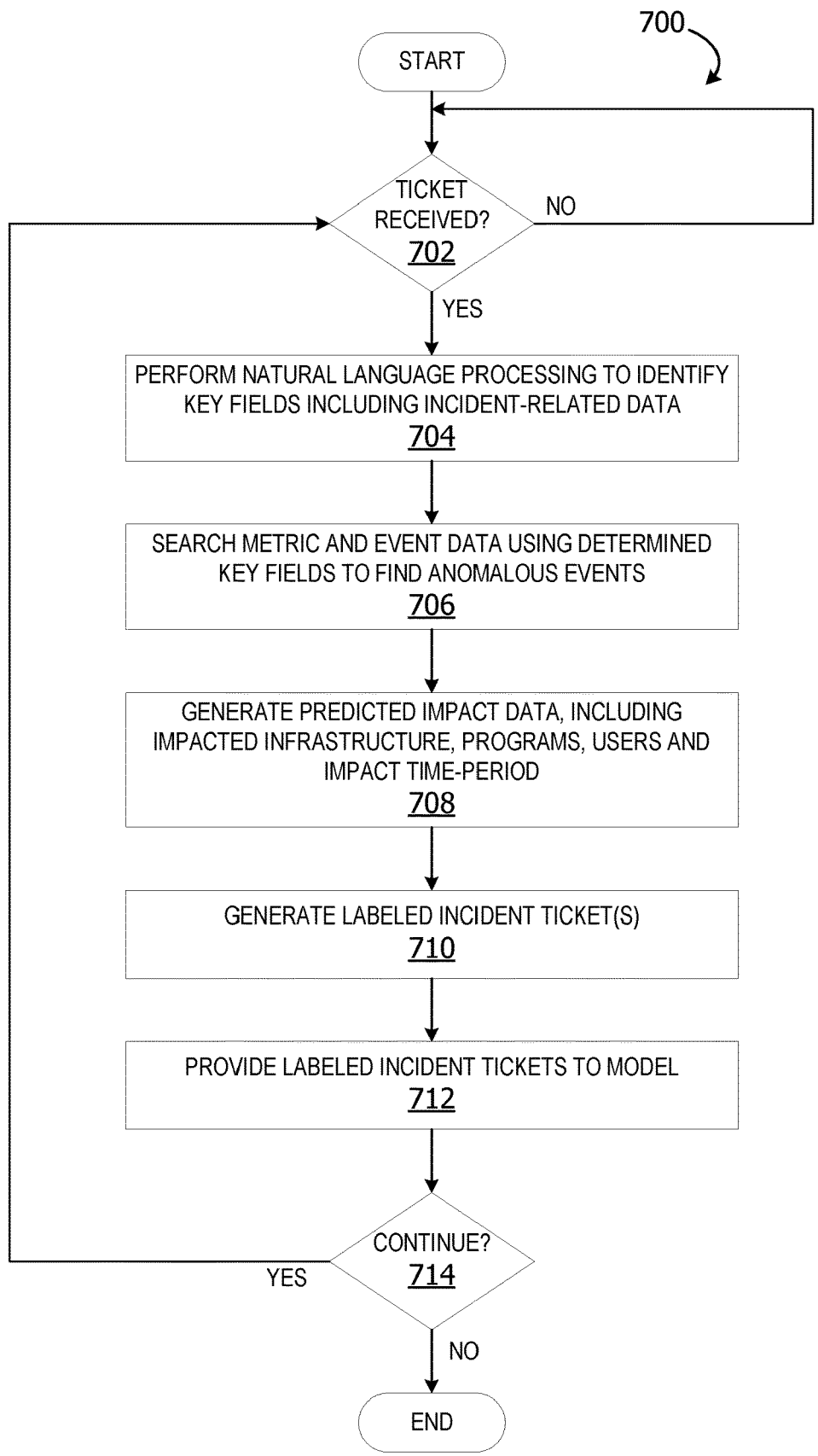
FIG. 7 is an exemplary flow chart illustrating a method of analyzing incident ticket data to generate labeled incident tickets according to an embodiment.

FIG. 7 is an exemplary flow chart illustrating a method of analyzing incident ticket data to generate labeled incident tickets according to an embodiment. It should be understood that the method 700 as described may be implemented and/or executed by one or more components of a system, such as system 100 and/or the ticket manager component 108 described above with respect to FIGS. 1 through 5.

The process begins when an incident ticket is received at 702. At 704, natural language processing is performed on the user-generated natural language text of the incident ticket to identify key fields (fields of interest), including incident-related data. The fields include user-provided data such as impacted infrastructure, software, users and/or time-period associated with the reported issue. At 706, metric and event data (monitor data) is searched using the determined key fields to find anomalous events and/or anomalous metrics used to generate the predicted impact data. At 708, predicted impact data is generated. The predicted impact data is generated based on impact data extracted from the selected incident ticket, monitor data captured during the relevant impact time-period and/or anomalous data detected during the impact time-period. The predicted impact data includes predicted impacted infrastructure, programs, users and impact time-period. At 710, labeled incident ticket(s) are generated. The labeled incident tickets are provided to the impact model at 712. A determination is made as to whether to continue at 714. If yes, the process iteratively executes 702 through 714. If a determination is made to not continue at 714, the process terminates thereafter.

Figure 8:
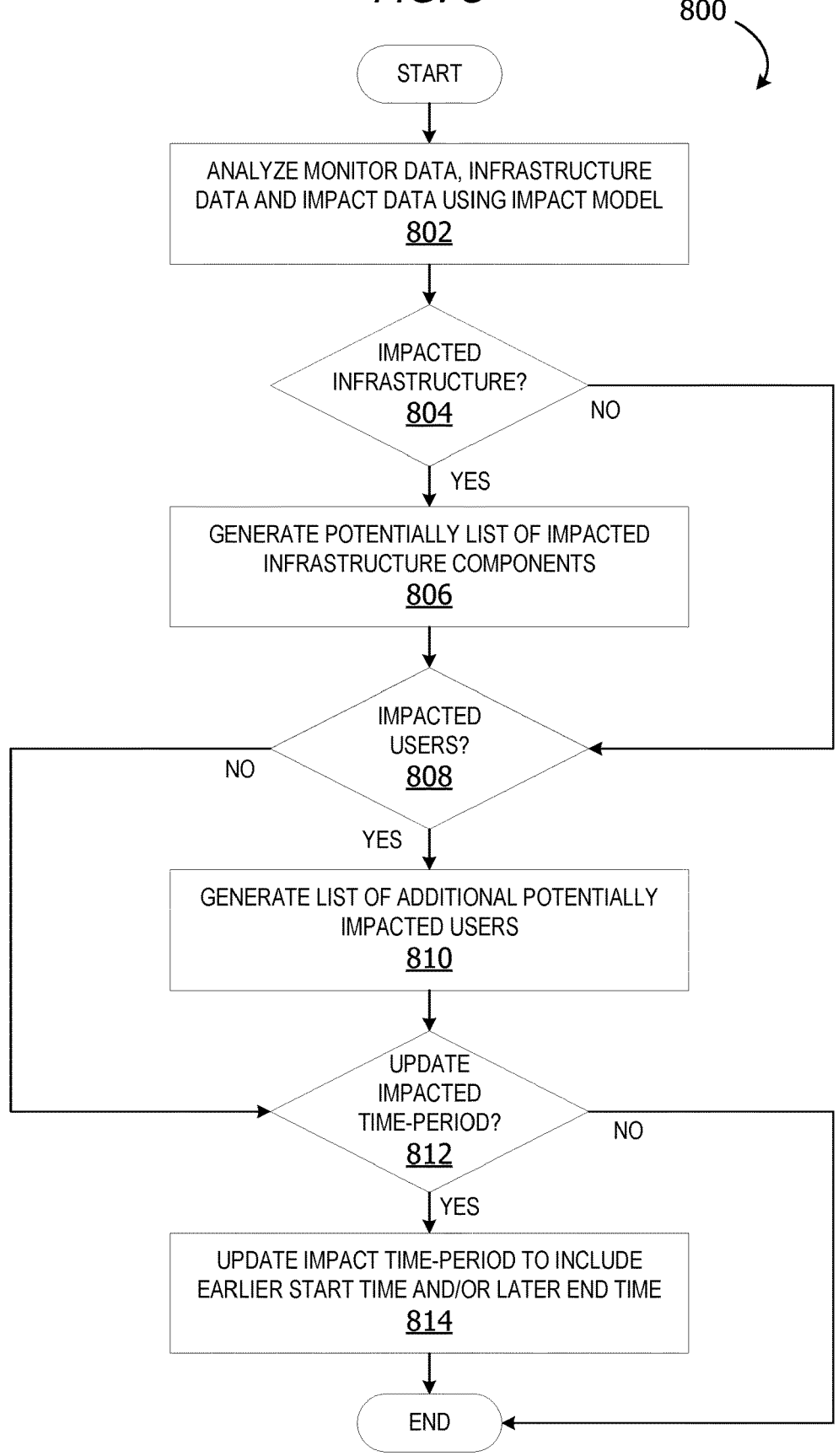
FIG. 8 is an exemplary flow chart illustrating a method of identifying impacted infrastructure elements and updating the impact time-period according to an embodiment.

FIG. 8 is an exemplary flow chart illustrating a method of identifying impacted infrastructure elements and updating the impact time-period according to an embodiment. It should be understood that the method 800 as described may be implemented and/or executed by one or more components of a system, such as system 100 and/or the ticket manager component 108 described above with respect to FIGS. 1 through 5.

The process begins by analyzing monitor data, infrastructure data and/or impact data by the impact model at 802. A determination is made whether infrastructure elements are impacted at 804. If yes, a list of potentially impacted infrastructure components is generated at 806. A determination is made as to whether one or more additional users unidentified in the incident tickets are impacted at 808. If yes, a list of additional potentially impacted users is generated at 810. A determination is made whether to update the impact time-period at 812. If yes, the impact time-period is updated to include an earlier start time and/or a later end time at 814. The process terminates thereafter.

In the example above, the impact time-period is updated to include an earlier start time and/or a later end time. In still other examples, the impact time-period is refined/narrowed by updating the impact time-period with an updated later start time and/or an updated earlier end time.

Figure 9:
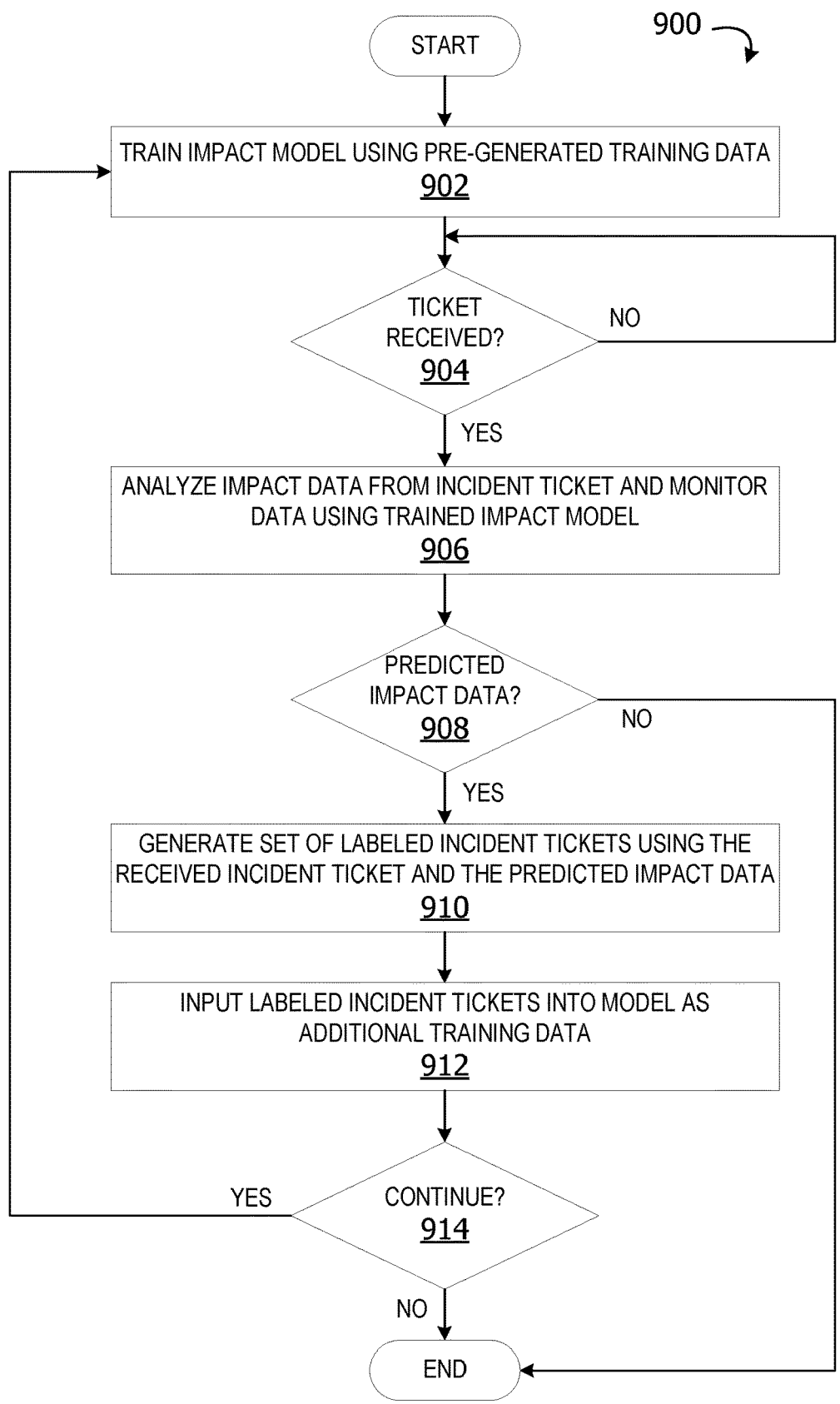
FIG. 9 is an exemplary flow chart illustrating a method of training an impact model using labeled incident tickets according to an embodiment.

FIG. 9 is an exemplary flow chart illustrating a method of training an impact model using labeled incident tickets according to an embodiment. It should be understood that the method 900 as described may be implemented and/or executed by one or more components of a system, such as system 100 and/or the ticket manager component 108 described above with respect to FIGS. 1 through 5.

The process begins by training an impact model using pre-generated training data at 902. A determination is made whether an incident ticket is received at 904. If yes, impact data from an incident ticket and monitor data is analyzed using the trained impact model at 906. A determination is made as to whether predicted impact data is available from the impact model at 908. If yes, a set of labeled incident tickets are generated using the received incident ticket and the predicted impact data at 910. At 912, the labeled incident tickets are input into the impact model as additional training data. A determination is made as to whether to continue at 914. If yes, operations 902 through 914 are iteratively executed until a determination is made to not continue. The process terminates thereafter.

Additional Example Scenarios

Aspects of the disclosure enable various additional scenarios, such as next described. In some examples, the system utilizes machine learning and artificial intelligence to review/analyze user-generated incident tickets. In one non-limiting example, the analysis includes perform multi-label classification on new tickets. Relevant data associated with one or more fields of interest are extracted and further analyzed. The analysis results are utilized by the system to determine/predict impacted infrastructure, time frames and suggests anomalous metrics and events using key pieces of data from the incident tickets. The system utilizes potential key performance indicators that indicated the event producing predicted infrastructure, customers, programs and/or time frames.

The ticket manager component in other examples ingests incident ticket details and autonomously analyzes the ticket data with other dynamic data to produce a list of potentially impacted infrastructure, programs, customers, start times and/or end times. This enables the system to standardize, facilitate and augment root cause analysis of issues. The predicted impact data further improves data quality while minimizing user time expended.

The impact model in another example includes machine learning anomaly detection processes for dynamically finding anomalous events and/or metrics that could indicate the incident using the key pieces of data along with labeled incident training data. The system provides more detailed description of the incident using a more precise timeframe and/or providing a more accurate/expanded list of impacted infrastructure. The system further generates a list of metrics (anomalous data) that experience anomalous behavior during the impacted timeframe.

In an example scenario, if an incident ticket reports a problem with program "A", but it does not identify the server hosting/running the program, the system analyzes infrastructure data and/or monitor data to identify which server(s) are affected based on the information available. Thus, the ticket manager component automatically identifies infrastructure components such as servers, which are impacted by the issue, even if the incident ticket does not provide that information. Likewise, if the server name is provided in the incident ticket, the ticket manager component analyzes available data, such as system log messages and operating system metric data, to verify the server name is correct and detect any potential typographical errors in the user-generated incident tickets.

In another example scenario, a first user unable to log into an application "A" at 5:20 p.m. generates an incident ticket. The ticket manager component correlates the user-generated incident tickets and extracts interesting fields (impact data) from the tickets. The impact data is used as a proxy to locate additional information associated with the login failure issue. The impact model predicts additional infrastructure and/or users affected by the problem with application "A." Although the incident ticket impact time-period identifies the time-period as 5:20 p.m., the system can determine that other users were also impacted by the problem with application "A" between 5:15 p.m. and 5:45 p.m. Therefore, the system updates the time-period to include the expanded timeframe.

In other examples, the impact timeframe can be updated to limit or narrow/retract the impact timeframe. For example, the impact time-period can be updated to include an updated start time which is later than the user-provided start time and/or an updated end-time that is earlier than the user-provided impact end time to further refine the relevant time-frame during which monitor data is searched for anomalous data and/or other relevant data associated with infrastructure impact associated with the reported issue of the user-generated incident ticket.

In the example above, although only one user submitted an incident ticket, the system can determine that the problem with application "A" impacted six other users in addition to the first user. Therefore, the system generates a list of potentially impacted users that includes all seven users instead of just the first user. The information is used to expand/add details to existing incident tickets. The system can also generate additional new incident tickets for the six other users.

Likewise, although the incident ticket only identified application "A", the system analysis can determine that the underlying issue resulted in log-in problems for three programs. In this case, the list of potentially impacted infrastructure components includes all three programs rather than only application "A." This more detailed information enables more accurate root cause analysis.

Exemplary Operating Environment

Figure 10:
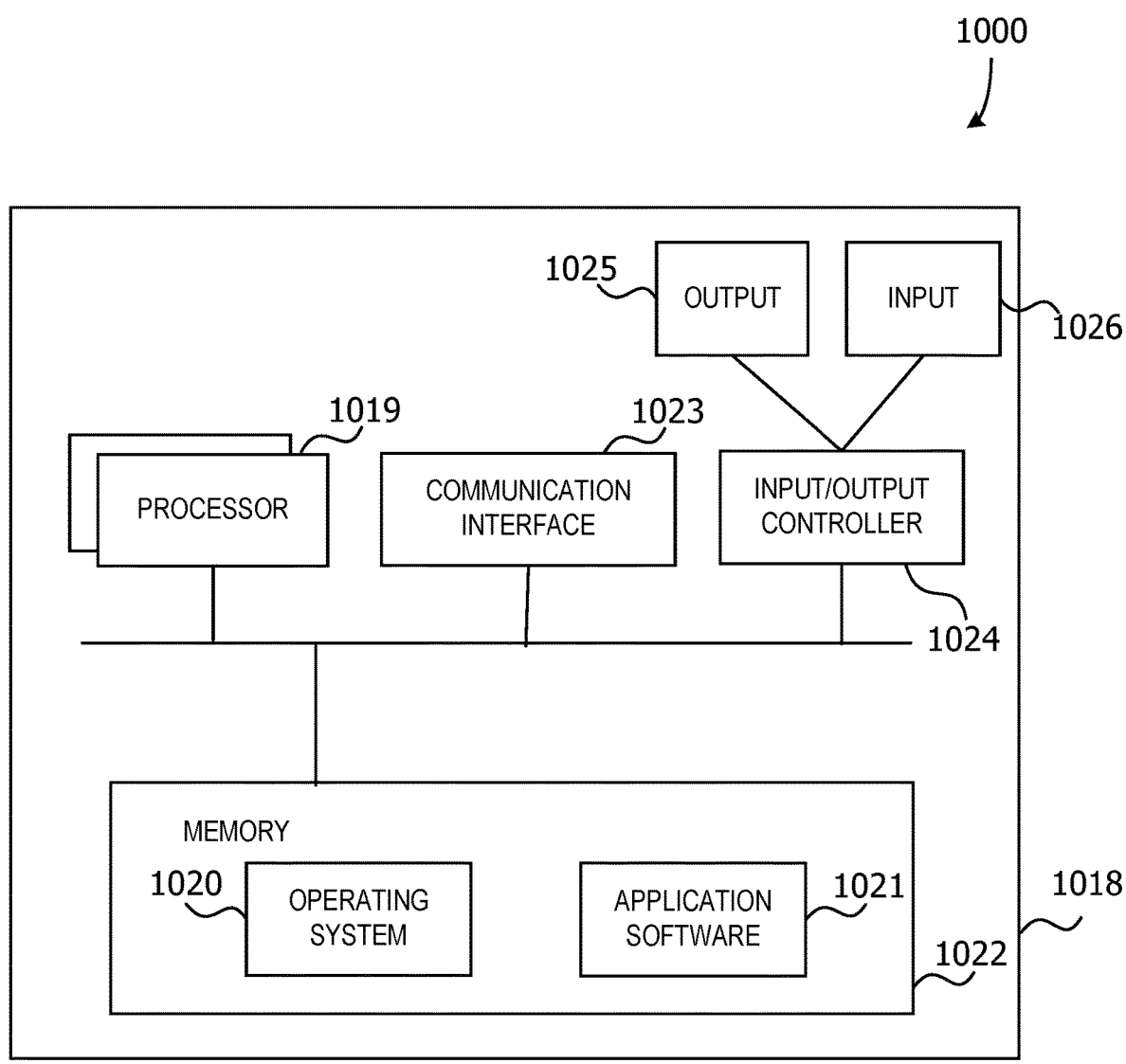
FIG. 10 illustrates a computing apparatus according to an embodiment as a functional block diagram.

The present disclosure is operable with a computing apparatus according to an embodiment as a functional block diagram 1000 in FIG. 10. In an embodiment, components of a computing apparatus 1018 may be implemented as a part of an electronic device according to one or more embodiments described in this specification. The computing apparatus 1018 comprises one or more processors 1019 which may be microprocessors, controllers or any other suitable type of processors for processing computer executable instructions to control the operation of the electronic device. Alternatively, or in addition, the processor 1019 is any technology capable of executing logic or instructions, such as a hardcoded machine. Platform software comprising an operating system 1020 or any other suitable platform software may be provided on the apparatus 1018 to enable application software 1021 to be executed on the device. According to an embodiment, an impact model autonomously analyzes user-generated incident tickets and outputs labeled incident tickets including more detailed descriptions of the reported issue(s) identified in the user-generated incident tickets. The labeled incident tickets further include predicted impact data identifying predicted infrastructure components and/or users likely to be impacted by the reported issue based on extracted impact data and anomalous data during the impact time-period associated with the reported issue.

Computer executable instructions may be provided using any computer-readable media that are accessible by the computing apparatus 1018. Computer-readable media may include, for example, computer storage media such as a memory 1022 and communications media. Computer storage media, such as a memory 1022, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1022) is shown within the computing apparatus 1018, it will be appreciated by a person skilled in the art, that the storage may be distributed or located remotely and accessed via a network or other communication link (e.g. using a communication interface 1023).

The computing apparatus 1018 may comprise an input/output controller 1024 configured to output information to one or more output devices 1025, for example a display or a speaker, which may be separate from or integral to the electronic device. The input/output controller 1024 may also be configured to receive and process an input from one or more input devices 1026, for example, a keyboard, a microphone or a touchpad. In one embodiment, the output device 1025 may also act as the input device. An example of such a device may be a touch sensitive display. The input/output controller 1024 may also output data to devices other than the output device, e.g. a locally connected printing device. In some embodiments, a user may provide input to the input device(s) 1026 and/or receive output from the output device(s) 1025.

The functionality described herein can be performed, at least in part, by one or more hardware logic components. According to an embodiment, the computing apparatus 1018 is configured by the program code when executed by the processor 1019 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: identify impact data associated with at least one issue based on incident-related data obtained from a selected incident ticket, the impact data including an impact time-period; generate predicted impact data including additional data describing a set of potentially impacted infrastructure elements; and create a set of labeled incident tickets associated with the issue, the labeled incident ticket including at least a portion of the predicted impact data.

One or more exemplary non-transitory computer readable storage media comprises computer-executable instructions for managing incident tickets that, upon execution by a processor, cause the processor to at least: identify impact data associated with at least one issue based on incident-related data obtained from a selected incident ticket, the impact data including an impact time-period; generate predicted impact data including additional data describing a set of potentially impacted infrastructure elements, the set of potentially impacted infrastructure elements comprising at least one of a set of potential impacted users, a set of potentially impacted infrastructure components and an updated time-period based on analysis of the impact data with infrastructure data and real-time monitor data and/or stored monitor data associated with a set of infrastructure components; and create a set of labeled incident tickets associated with the issue, the labeled incident ticket including at least a portion of the predicted impact data.

Alternatively, or in addition to the other examples described herein, examples include any combination of the following:
  analyze, by an analysis component, the real-time monitor data during the impact time-period or an updated impact time-period to identify a set of anomalous data, the set of anomalous data comprising at least one of anomalous event data and anomalous metric data;
  train the impact model using training data, including the set of labeled incident tickets;
  wherein the impact data includes user-generated data extracted from the selected incident ticket, the impact data identifying at least one of a set of impacted infrastructure components, a set of impacted users, an impact start time and an impact end time;
  analyze the infrastructure data, including a set of known infrastructure components identifying at least one of hardware components and software components; and
  identify a list of potentially impacted infrastructure components unidentified in the incident ticket associated with the issue from the set of known infrastructure components;
  analyze the infrastructure data, including a set of known users associated with at least one infrastructure component potentially impacted by the issue;
  identify a list of additional potentially impacted users identified in the incident ticket associated with the issue from the set of known infrastructure components;
  analyze the monitor data and infrastructure data to determine whether to expand the impact time-period;
  update the impact time-period to include at least one of an earlier start time and a later end time;
  identifying, by an extraction component, impact data associated with at least one issue based on incident-related data obtained from a selected incident ticket, the impact data including an impact time-period;
  generating, by a prediction component, predicted impact data including additional data describing a set of potentially impacted infrastructure elements;
  creating, by an update component, a set of labeled incident tickets associated with the issue, the labeled incident ticket including at least a portion of the predicted impact data;
  analyzing, by an analysis component, the real-time monitor data during the impact time-period or an updated time-period to identify a set of anomalous data, the set of anomalous data comprising at least one of anomalous event data and anomalous metric data; and
  wherein the set of potentially impacted infrastructure elements comprising at least one of a set of potential impacted users, a set of potentially impacted infrastructure components and an updated time-period based on analysis of the impact data with infrastructure data and real-time monitor data associated with a set of infrastructure components.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for managing incident tickets, the ticket manager component including an impact model; exemplary means for identifying impact data associated with at least one issue based on incident-related data obtained from a selected incident ticket, the impact data including an impact time-period; exemplary means for generating predicted impact data including additional data describing a set of potentially impacted infrastructure elements; and exemplary means for creating a set of labeled incident tickets associated with the issue, the labeled incident ticket including at least a portion of the predicted impact data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method performed by a computer system for predicting impact on infrastructure elements based on incident ticket data, the method comprising:
   receiving an incident ticket during an impact time period, the incident ticket including data related to an incident;
   performing natural language processing of the data included in the incident ticket to identify key fields;
   using the key fields, searching metric data and event data associated with the incident ticket to identify anomalous events during an updated time period including the impact time period and additional time;
   generating predicted impact data for the updated time period based on the identified anomalous events, the predicted impact data identifying one or more infrastructure elements unidentified in the incident ticket;
   using the predicted impact data, generating one or more labeled incident tickets;
   using the one or more labeled incident tickets, training an impact model;
   causing the trained impact model to predict a set of infrastructure elements likely to be impacted based on a newly received incident ticket; and
   updating the newly received incident ticket with the predicted set of infrastructure elements.

2. The method of claim 1, wherein the key fields include one or more of currently impacted infrastructure elements, currently impacted users, and a time period associated with the incident.

3. The method of claim 1, wherein the impact model comprises a machine learning component, the method further comprising:
   training the machine learning component by a ticket manager using the one or more labeled incident tickets.

4. The method of claim 1, wherein the incident ticket comprises an incident ticket received from a user currently facing at least one issue.

5. The method of claim 1, wherein the additional time is calculated using an analysis of real-time system monitor data, including event logs and metric data.

6. The method of claim 1, wherein the trained impact model predicts one or more infrastructure elements that are impacted by the incident, which were not included in the data included in the incident ticket.

7. The method of claim 1, wherein the set of infrastructure elements includes at least one of potentially impacted users, potentially impacted infrastructure components and an expanded time period during which the set of infrastructure elements continue to be affected.

8. The method of claim 1, wherein the method further comprises obtaining user feedback indicating a degree of accuracy of the one or more labeled incident tickets and using the obtained user feedback to refine the trained impact model.

9. A system for predicting impact on infrastructure elements based on incident ticket data, the system comprising:
   at least one processor; and
   at least one memory comprising computer program code, the at least one memory and the computer program code configured to cause the at least one processor to:
   receive an incident ticket, the incident ticket including data related to an incident occurred during an impact time period;

perform natural language processing of the data included in the incident ticket to identify key fields;

using the key fields, search metric data and event data associated with the incident ticket to identify anomalous events during an updated time period including the impact time period and additional time;

generate predicted impact data for the updated time period based on the identified anomalous events, the predicted impact data identifying one or more infrastructure elements unidentified in the incident ticket;

using the predicted impact data, generate one or more labeled incident tickets;

using the one or more labeled incident tickets train an impact model;

cause the trained impact model to predict a set of infrastructure elements likely to be impacted based on a newly received incident ticket; and update the newly received incident ticket with the predicted set of infrastructure elements.

10. The system of claim 9, wherein the key fields include one or more of currently impacted infrastructure elements, currently impacted users, and a time period associated with the incident.

11. The system of claim 9, wherein the impact model comprises a machine learning component, and wherein the at least one memory and the computer program code is configured to further cause the at least one processor to:
train the machine learning component by a ticket manager using the one or more labeled incident tickets.

12. The system of claim 9, wherein the incident ticket comprises an incident ticket received from a user currently facing at least one issue.

13. The system of claim 9, wherein the additional time is calculated using an analysis of real-time system monitor data, including event logs and metric data.

14. The system of claim 9, wherein the trained impact model predicts one or more infrastructure elements that are impacted by the incident, which were not included in the data included in the incident ticket.

15. The system of claim 9, wherein the set of infrastructure elements includes at least one of potentially impacted users, potentially impacted infrastructure components and an expanded time period during which the set of infrastructure elements continue to be affected.

16. The system of claim 9, wherein the at least one memory and the computer program code is configured to further cause the at least one processor to:

obtain user feedback indicating a degree of accuracy of the one or more labeled incident tickets and using the obtained user feedback to refine the trained impact model.

17. One or more non-transitory computer storage media having computer-executable instructions embodied thereon, for predicting impact on infrastructure elements based on incident ticket data, wherein upon execution by at least one processor, the computer-executable instructions cause the processor to:

receive an incident ticket, the incident ticket including data related to an incident occurred during an impact time period;

perform natural language processing of the data included in the incident ticket to identify key fields;

using the key fields, search metric data and event data associated with the incident ticket to identify anomalous events during an updated time period including the impact time period and additional time;

generate predicted impact data for the updated time period based on the identified anomalous events, the predicted impact data identifying one or more infrastructure elements unidentified in the incident ticket;

using the predicted impact data, generate one or more labeled incident tickets;

using the one or more labeled incident tickets train an impact model;

cause the trained impact model to predict a set of infrastructure elements likely to be impacted based on a newly received incident ticket; and update the newly received incident ticket with the predicted set of infrastructure elements.

18. The one or more non-transitory computer storage media of claim 17, wherein the key fields include one or more of currently impacted infrastructure elements, currently impacted users, and a time period associated with the incident.

19. The one or more non-transitory computer storage media of claim 17, wherein the impact model comprises a machine learning component, and wherein upon execution by at the at least one processor, the computer-executable instructions further cause the processor to:
train the machine learning component by a ticket manager using the one or more labeled incident tickets.

20. The one or more non-transitory computer storage media of claim 17, wherein the incident ticket comprises an incident ticket received from a user currently facing at least one issue.

* * * * *